(No Model.)
W. T. NESBET.
FILTER.
No. 363,668. Patented May 24, 1887.
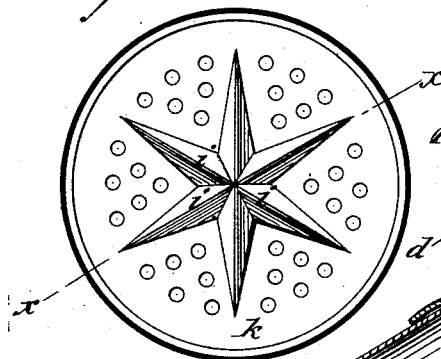
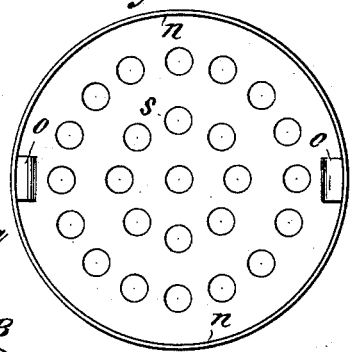
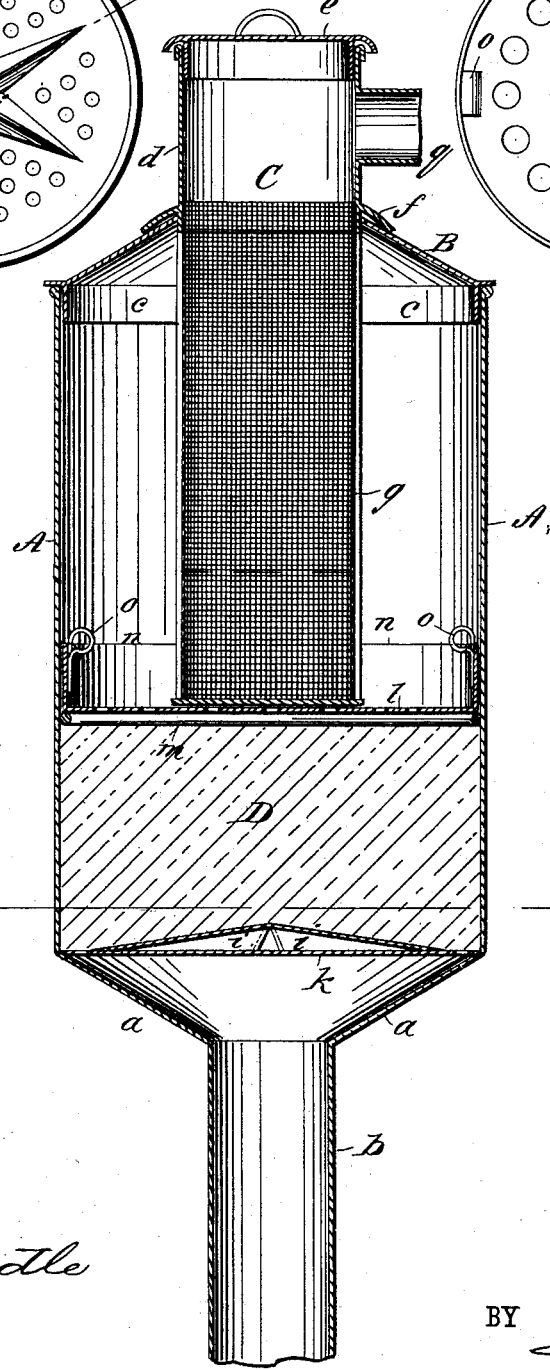
WITNESSES:
F. M. Ardle
C. Sedgwick
INVENTOR:
W. T. Nesbet
BY Munn & Co.
ATTORNEYS.

UNITED STATES PATENT OFFICE.

WILLIAM TOLIVER NESBET, OF SCHELL CITY, MISSOURI.

FILTER.

SPECIFICATION forming part of Letters Patent No. 363,668, dated May 24, 1887.

Application filed March 18, 1887. Serial No. 231,404. (No model.)

*To all whom it may concern:*

Be it known that I, WILLIAM TOLIVER NESBET, of Schell City, in the county of Vernon and State of Missouri, have invented a new and Improved Filter, of which the following is a full, clear, and exact description.

My invention relates to the construction of a rain-water filter by which the water delivered from the roof is strained and filtered before entering the cistern; and the invention consists of a vertically-placed cylinder, within which a smaller perforated cylinder, which acts as a strainer, is arranged above the filter proper; and the invention further consists of an arrangement whereby the strainer and filter can be readily cleaned.

Reference is to be had to the accompanying drawings, forming part of this specification, in which similar letters of reference indicate corresponding parts in all the figures.

Figure 1 is a vertical sectional elevation of the filter. Fig. 2 is a plan view of the distributing-pan. Fig. 3 is a plan view taken on the line $y$ $y$ of Fig. 1.

Referring, now, to the construction of the filter, A represents the main exterior casing, which consists of a cylinder having a sloping bottom, $a$, from which there projects a spout, $b$, arranged to fit within the pipe leading to the cistern.

The cover B of the cylinder A is preferably formed, as shown, with a downwardly-projecting interior flange, $c$, the cover proper rising from the outer edge in the form of a cone, but having a central opening, through which the strainer C is inserted. This strainer consists of an upper projecting portion, $d$, formed of sheet metal and closed by a removable cover, $e$, a collar, $f$, being secured near the lower end of said section or portion $d$, which collar is arranged to project over the cover B and prevent water from entering the cylinder A, and a lower and interior portion or section, $g$, which is made of perforated sheet metal or of wire-cloth, the bottom of the section being made of an imperforated piece of sheet metal.

The filtering material rests upon a perforated partition, $k$, which is secured within and at the bottom of the cylinder A, said partition being provided with ridges $i$ $i$, which radiate in the form of a star from the center of the partition $k$, the highest portion of the ridges being in the center, as shown in Figs. 1 and 3.

As before stated, the filtering material shown at D rests upon the partition $k$, being confined within the lower portion of the cylinder by a pan or tray, $l$, which rests upon a shoulder, $m$, formed by soldering or otherwise securing a wire about the inner sides of the cylinder. The pan $l$ has upwardly-projecting sides $n$ $n$, which fit close to the walls of the cylinder and carry handles $o$ $o$, by which the pan may readily be lifted out of the cylinder after the removal of the cover B and strainer C.

Water is led into the strainer C through the pipe $q$, which projects outward from the section $d$, and passes down into strainer proper or section, $g$, which will prevent the passage of all kinds of débris to the filtering material. As the water flows through the strainer it passes to the pan $l$, which distributes it evenly over the top of the filtering material, and, passing through the said filtering material, the water is free to run into the cistern.

A strainer and filter constructed as described presents an extended straining-surface and is so arranged that when any of the parts are fouled they can be readily cleansed. The filter can be inserted in the line of the leader, and does not require a great number of elbow-joints, such as are necessary in other forms of filters.

Having thus fully described my invention, I claim as new and desire to secure by Letters Patent—

1. The combination, with the cylinder A, cover B, and bottom $a$, leading to the pipe $b$, of the strainer C, formed of the portions $d$ and $g$ and having the collar $f$ and cover $e$, the section $d$ being provided with a pipe, $q$, and a partition, $k$, and pan $l$, between which the filtering material is placed, substantially as described.

2. The combination, with the cylinder A, cover B, and bottom $a$, leading to the pipe $b$, of the strainer C, formed of the portions $d$ and $g$, the section $d$ being provided with cover $e$, collar $f$, and pipe $q$, and the filtering material, which is confined and held by a partition, $k$, formed with ridges $i$ $i$, and a pan, $l$, having walls $n$ $n$ and handles $o$ $o$, and resting on a shoulder, $m$, substantially as described.

WILLIAM TOLIVER NESBET.

Witnesses:
L. D. TALMADGE,
H. H. THOMPSON.